July 26, 1927.
E. DEWOITINE
CONSTRUCTION OF AEROPLANE WINGS
Filed July 8, 1924
1,636,902
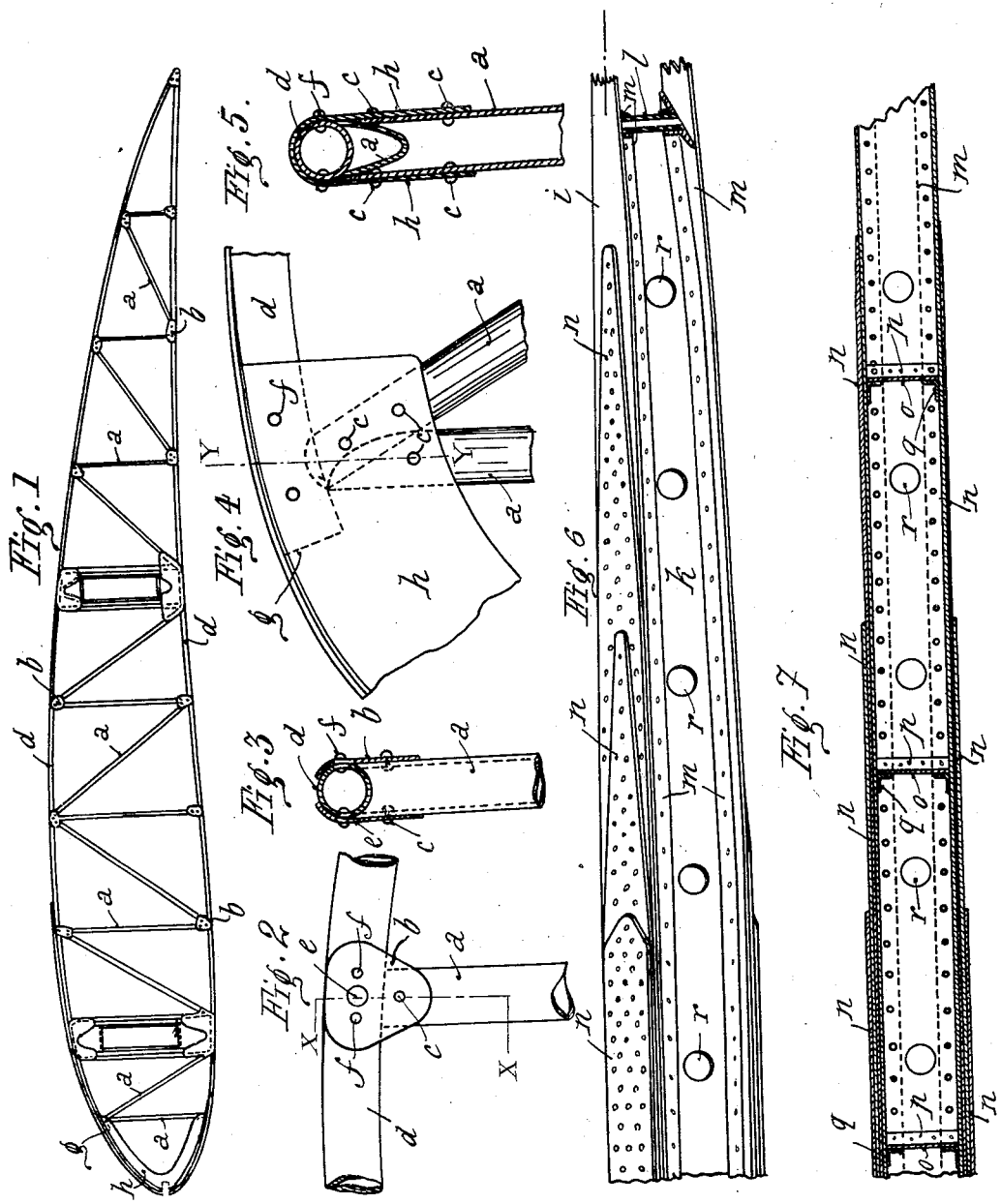

Patented July 26, 1927.

1,636,902

UNITED STATES PATENT OFFICE.

EMILE DEWOITINE, OF TOULOUSE, FRANCE.

CONSTRUCTION OF AEROPLANE WINGS.

Application filed July 8, 1924, Serial No. 724,855, and in France July 17, 1923.

The present invention has for its object various improvements in the construction of ribs and spars for aeroplane wings.

According to this invention, the ribs consist of a plurality of metallic tubes which are riveted together. The connections between the said tubes are preferably obtained by gussets which are riveted to the tubes forming the uprights and clamp the tubes forming the upper and lower edges of the ribs, to which they are likewise riveted. This assembling arrangement is based upon the principle that the stress upon a compressed tube is a maximum midway upon its length and is a minimum at the joints, so that is quite admissible to pierce holes at the joints of the compressed tubes and to ascertain whether in these conditions they will have a sufficient resistance to simple compression without danger of distortion. In the case of tubes subjected to traction, care is to be taken that the tubes still have a sufficient cross section, and this will lead to the adoption for the whole set of tubes of a section which is but little above what is strictly necessary.

Further, as but little advantage is to be had by the use of tubes in the region of the leading edge which has a pronounced curvature, I replace the tubes in this region by two metal plates.

The invention also relates to a form of construction of wing spar of the maximum lightness by means of a box construction comprising sole plates or sills, wherein the height, width and thickness of the said plates are varied in a regular manner. In my invention, the said soles consist of sheet metal members having pointed ends which are superposed in variable number according to their position upon the spar.

The following description, together with the appended drawings which are given by way of example, sets forth the said invention.

Fig. 1 shows a wing rib according to the invention.

Fig. 2 shows a joint of the same on a larger scale.

Fig. 3 is a section on the line X—X of Fig. 2.

Fig. 4 shows on a larger scale the method of connecting the tubes of the rib with the sheet metal parts of the leading edge.

Fig. 5 is a section on the line Y—Y of Fig. 4.

Fig. 6 is a perspective view of a spar.

Fig. 7 is a longitudinal section of the same.

The tubes forming the wing rib are assembled as shown in Fig. 1. The tube $a$ of the structure, whether a vertical tube (as herein illustrated) or an inclined tube, is held between two metal plates $b$ forming gussets which are somewhat curved in order to fit upon the said tube, and is riveted at its open end into which the rivet $c$ and then the riveting tool can be introduced. Two rivets will usually suffice, or one for each plate, but obviously any suitable number of rivets may be employed, the end of the upright thus formed is then placed in contact with the outer tube $d$ of the rib, in such manner that the said tube is inserted between the two gussets, and the latter are bent by means of the hammer against the surface of the tube; the hole $e$ is then pierced through the gussets and the tube, thus providing for the introduction of the rivets $f$ as well as the riveting tool.

The said process is of a very general nature, and it provides for the assembling of any suitable number of tubes N, limited solely by the space occupied, and whereof the number $N^1$ are connected at the ends and only one at any given point on its length. This latter tube being apertured, it is not necessary that the radius or the thickness of the tubes should be uniform.

At the leading edge in which the curvature is pronounced the tubes are stopped for instance at $g$ at a certain distance from the leading edge, and are held between two metal plates $h$ with curved edges, which are riveted to the tubes $a\ a$ through the interior of the latter, since the ends of the tubes remain open.

The spar according to my invention, Figs. 6 and 7, is of the box type, consisting of two soles formed of metal plates cut into shape and superposed $i$ and $j$, and of the two cheeks or webs $k$ and $l$.

The said soles and cheeks are assembled by the angle irons $m$.

The spar thus composed has the maximum lightness, this being obtained by varying in a regular manner the height, width and thickness of the soles. By acting upon the three parameters one can obtain all the regularity which may be desired, without employing in any case a thickness of the sole which is either too great or too small; the variation in thickness is obtained by assembling the plates *n* (whose thickness is constant) in variable number. As shown in Fig. 6, said plates have a pointed shape, thus providing for the perfect continuity of the stresses. A sufficient number of rivets should be employed in order to prevent all distortion of the soles under compression stress, either as a whole or by a slipping action. The said soles are entirely finished before they are attached to the cheeks or webs, this latter operation can be performed without difficulty, since the angle irons *m* are placed as a rule at the exterior. However—and this forms another improvement according to the invention—angle irons may if desired be also disposed in the interior and are riveted to the soles and webs, this being made possible by the use of holes *r* formed in the webs *k* and *l* for the introduction of the rivets and the riveting tool.

The said spar is completed by the sheet metal partitions *o*, spaced at suitable intervals, which are preliminarily attached to the webs at *p* and are also riveted to the said soles at *q*, should this be desired, by operating through the holes *r*.

What I claim is:—

1. A structural frame for aeroplane wings comprising ribs formed of tubes, plates riveted to said tubes for the assembling of the latter, spars each of which consists of a box element having two sole plates formed of superposed sheet metal members cut in a point at the ends and riveted together, said sole plates being connected together by cheeks or webs.

2. A structural frame for aeroplane wings comprising ribs formed of tubes, plates riveted to said tubes for the assembling of the latter, spars each of which consists of a box element having two sole plates formed of superposed sheet metal members cut in a point at the ends and riveted together, cheeks or webs for assembling the sole plates of the said spars, holes being formed in the said webs, angle irons riveted on the one hand to the said soles and on the other hand to the said webs, by means of apertures formed in the latter.

3. A structural frame for aeroplane wings comprising ribs formed of tubes, means for assembling the said tubes, metal plates constituting the leading edge of each rib, and spars disposed within the said ribs and perpendicular thereto, comprising sole plates formed of superposed and riveted metal plates.

In testimony that I claim the foregoing as my invention, I have signed my name hereto.

EMILE DEWOITINE.